United States Patent
Cockcroft

(10) Patent No.: US 10,075,533 B2
(45) Date of Patent: Sep. 11, 2018

(54) METHOD AND APPARATUS FOR TRANSFERRING THE STATE OF CONTENT USING SHORT CODES

(75) Inventor: Oliver N. Cockcroft, Los Gatos, CA (US)

(73) Assignee: PAYPAL, INC., San Jose, CA (US)

( * ) Notice: Subject to any disclaimer, the term of this patent is extended or adjusted under 35 U.S.C. 154(b) by 479 days.

(21) Appl. No.: 13/614,597

(22) Filed: Sep. 13, 2012

(65) Prior Publication Data

US 2013/0073676 A1    Mar. 21, 2013

Related U.S. Application Data

(60) Provisional application No. 61/535,221, filed on Sep. 15, 2011.

(51) Int. Cl.
G06F 15/16 (2006.01)
H04L 29/08 (2006.01)
G06F 17/30 (2006.01)

(52) U.S. Cl.
CPC ...... *H04L 67/142* (2013.01); *G06F 17/30887* (2013.01)

(58) Field of Classification Search
None
See application file for complete search history.

(56) References Cited

U.S. PATENT DOCUMENTS

| | | |
|---|---|---|
| 6,636,888 B1 | 10/2003 | Bookspan et al. |
| 7,035,957 B2 | 4/2006 | Ishiwata |
| 8,819,798 B2 | 8/2014 | Zises |
| 2003/0195963 A1* | 10/2003 | Song .............. G06F 17/30861 709/227 |
| 2003/0208541 A1 | 11/2003 | Musa |
| 2004/0049673 A1* | 3/2004 | Song .............. G06F 17/3089 713/150 |
| 2004/0110462 A1* | 6/2004 | Forstadius ...... G06F 17/30902 455/3.01 |
| 2004/0139268 A1 | 7/2004 | Ishiwata |
| 2005/0289382 A1 | 12/2005 | Lee |
| 2006/0230265 A1* | 10/2006 | Krishna .............. 713/158 |
| 2007/0136279 A1* | 6/2007 | Zhou .............. G06F 17/30887 |
| 2009/0089561 A1* | 4/2009 | Tomko et al. ............ 712/228 |

(Continued)

FOREIGN PATENT DOCUMENTS

WO    WO-2013101950 A1    7/2013

OTHER PUBLICATIONS

"U.S. Appl. No. 13/340,046, Final Office Action dated Nov. 20, 2013", 20 pgs.
"U.S. Appl. No. 13/340,046, Non Final Office Action dated Apr. 24, 2013", 18 pgs.
"U.S. Appl. No. 13/340,046, Notice of Allowance dated Apr. 16, 2014", 8 pgs.

(Continued)

*Primary Examiner* — Mohamed A Wasel
*Assistant Examiner* — Tsung Wu
(74) *Attorney, Agent, or Firm* — Maschoff Brennan

(57) ABSTRACT

Method and a system to transfer the state of web-based content between devices through use of a short code. An example method includes determining a state of content being accessed on a device. The method further includes assigning a short code to the state of the content. The short code may have a limited number of characters. The method may further include storing the short code and the state of the content. The method may further include providing the content according to the state of the content on a second device based on the short code.

19 Claims, 7 Drawing Sheets

(56) References Cited

U.S. PATENT DOCUMENTS

| | | | |
|---|---|---|---|
| 2009/0247195 A1* | 10/2009 | Palmer | G06Q 30/02 455/466 |
| 2009/0257416 A1 | 10/2009 | Walker et al. | |
| 2009/0300138 A1* | 12/2009 | Schneider | 709/217 |
| 2009/0328177 A1* | 12/2009 | Frey | H04L 9/3213 726/9 |
| 2010/0087214 A1* | 4/2010 | Bournel | H04W 4/14 455/466 |
| 2011/0264992 A1* | 10/2011 | Vishria | G06F 17/30887 715/208 |
| 2013/0036231 A1 | 2/2013 | Suumäki | |
| 2013/0046893 A1 | 2/2013 | Hauser et al. | |
| 2013/0174237 A1 | 7/2013 | Zises et al. | |
| 2014/0359067 A1 | 12/2014 | Zises | |

OTHER PUBLICATIONS

"U.S. Appl. No. 13/340,046, Response filed Mar. 20, 2014 to Final Office Action dated Nov. 20, 2013", 12 pgs.
"U.S. Appl. No. 13/340,046, Response filed Aug. 26, 2013 to Non Final Office Action dated Apr. 24, 2013", 11 pgs.
"U.S. Appl. No. 14/462,398, Preliminary Amendment filed Aug. 29, 2014", 7 pgs.
"International Application Serial No. PCT/US2012/071848, International Preliminary Report on Patentability dated Jul. 10, 2014", 6 pgs.
"International Application Serial No. PCT/US2012/071848, International Search Report dated Mar. 8, 2013", 2 pgs.
"International Application Serial No. PCT/US2012/071848, Written Opinion dated Mar. 8, 2013", 4 pgs.

* cited by examiner

SHORT CODE TABLE

| CODE | PAGE | SECTION | SUB-SECTION | KEY TERMS | PARAMETERS |
|---|---|---|---|---|---|
| XY1JT7 | deals.ebay.com | Deals for guys | Item 7 | Golf club | View "Grid" |
| ZZ2J14 | search.ebay.com | Page 4 | Item 87 | "pez dispenser" | Price 15-45, distance 50 miles |
| Z57XYZ | vi.bay.com | Description | | 8114262016 | |
| OJLB45 | Vb.ebay.com | Item details | | 6780193798 | Count 3, size M, color blue |
| 8HK8JH | search.ebay.com | Page 1 | Item 23 | "laser pointer" | Best match, view "List" |

*FIG. 4*

METHOD AND APPARATUS FOR TRANSFERRING THE STATE OF CONTENT USING SHORT CODES

This application claims the priority benefit of U.S. Provisional Application No. 61/535,221, filed Sep. 15, 2011 and entitled "Shortcode as State Transfer," which is incorporated herein by reference.

TECHNICAL FIELD

Example embodiments of the present application relate generally to electronic devices, and more specifically, in an example embodiment, to a system and method for transferring a state of content among devices.

BACKGROUND

Networked devices are capable of accessing content on a website over a network connection. Content may be accessible via a network-addressable resource identifier, such as a Uniform Resource Locator (URL). In the course of accessing content, a user may progress beyond an initial starting point in accessing the content. For example, when a user is accessing an electronic commerce site, the user may perform one or more browsing and purchasing activities. In another example, when a user is accessing multimedia content, the user may view a portion of the content. In certain situations, the user may cease accessing the content from a particular device and may wish to resume accessing of the content from a different device. When the user accesses the content from a different device, the user may be required to re-enter the URL in order to render the content on the different device. However, the user may be taken back to an initial starting point of the URL instead of to the same portion of the content that the user was viewing on the first device. The user may then need to re-navigate to the desired portion of the content, resulting in frustration or delays for the user.

BRIEF DESCRIPTION OF THE DRAWINGS

Example embodiments of the present disclosure are illustrated by way of example, and not by way of limitation, in the figures of the accompanying drawings.

FIG. 4 shows an illustrative example of fields of a database table of a database for storing a short code.

DETAILED DESCRIPTION

Figure 1:
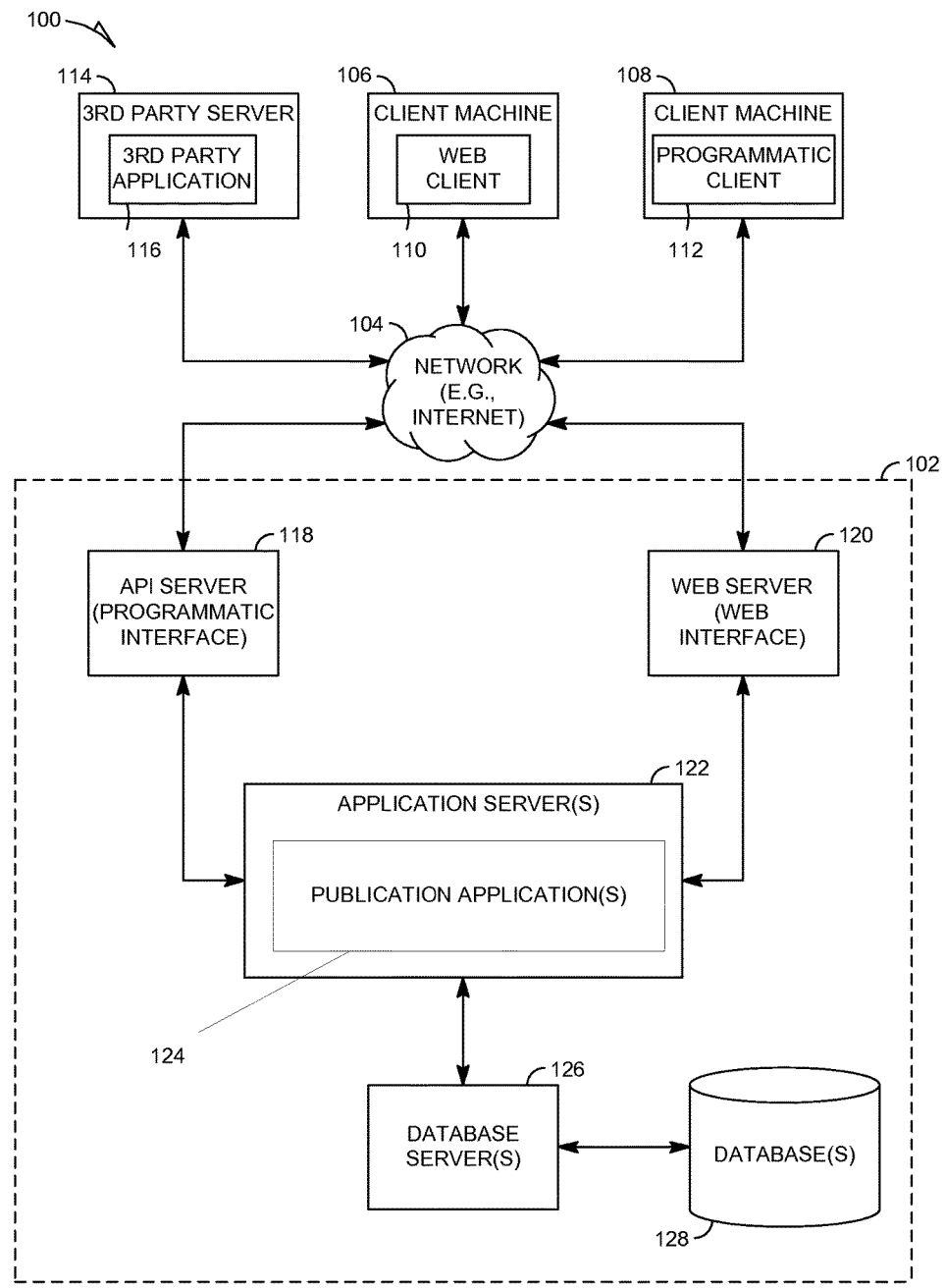
FIG. 1 is a block diagram of a network architecture of a system, according to some embodiments, having a client-server architecture configured for exchanging data over a network.

Methods and apparatuses used to transfer a code indicating the state of content between devices are disclosed. In the following description, for purposes of explanation, numerous specific details are set forth in order to provide a thorough understanding of the present disclosure. It may be evident, however, to one skilled in the art that the subject matter of the present disclosure may be practiced without these specific details.

Users of computing devices often view the same web page on multiple devices. For example, a user may view a web page on a first device such as a laptop, and later on a second device such as a smartphone. In many scenarios, the state of the web page is not important, and the user is not necessarily interested in viewing the web page in the same state on the second device. For example, if a user is viewing a news website on a first device and then wishes to view the same news website on a second device, the user can enter the web address on the second device to view the news content. Often, this is sufficient for the user's news-viewing needs.

However, in some situations the user may consider it important to access the content on the second device at the same point that the user was accessing the content on the first device. For example, a user may search for and view items on an auction website using a first device, such as a smart TV. The user may wish to complete the bidding or purchase on a second device such as a phone. However, it may be more difficult to browse to the auctioning site, search for the item of interest, etc. on the phone.

A user may wish to operate on any number of devices, all of which may be of different dimensions, and all of which may present a different graphical user interface (GUI) to a user. When a user changes from a device with a certain dimension and a certain GUI, to a second device with different dimensions and a different GUI, it may become more difficult to view certain content or to perform certain operations. For example, a smart TV may have relatively large dimensions and advanced GUI to make it easier to browse through a shopping website. Compared to a smart TV, a mobile phone would have very small dimensions and provide less navigability on a shopping website due to the size and features of the handset. A tablet or laptop computer may offer still different dimensions and GUI capabilities. However, while the GUI may be different on the different devices, the actual state of the website may be the same and the user may wish to view the website in the same state on the different devices, regardless of the details of dimension or GUI implementation on the different devices.

Example embodiments, therefore, allow the user to use a short code, with a limited number of characters, to simplify access to the content on the second device. In example embodiments, the first device may generate or provide the short code. The short code may be stored in a database or other storage means that relates or ties the short code to the state the content was in at the point the user was accessing the content on the first device. This short code may then be entered or relayed by other means to the second device, and the user may then resume access to the content on the second device at the same point the user left off accessing the content on the first device.

FIG. 1 is a network diagram depicting a network system 100, according to one embodiment, having a client-server architecture configured for exchanging data over a network 104 (e.g., the Internet or Wide Area Network (WAN)) to one or more clients. For example, the network system 100 may be a publication/publisher system 102 where clients may communicate and exchange data within the network system 100. The data may pertain to various functions (e.g., selling and purchasing of items) and aspects (e.g., data describing items listed on the publication/publisher system) associated with the network system 100 and its users. In some embodiments, the data may correspond to multimedia content, audio content, or visual content. Although illustrated herein as a client-server architecture as an example, other example embodiments may include other network architectures, such as a peer-to-peer or distributed network environment.

A data exchange platform, in an example form of a network-based publisher 102, may provide server-side functionality, via a network 104 (e.g., the Internet) to one or more clients. The one or more clients may include users that utilize the network system 100 and more specifically, the network-based publisher 102, to exchange data over the network 114. These transactions may include transmitting, receiving (communicating) and processing data to, from, and regarding content and users of the network system 100. The data may include content and user data. Such content and user data may be, for example, audio content; visual content; audiovisual content; feedback data; user reputation values; user profiles; user attributes; product and service reviews; product, service, manufacture, and vendor recommendations and identifiers; product and service listings associated with buyers and sellers; auction bids; transaction data; and payment data. However, it will be understood that such content and user data is not limited thereto.

In various embodiments, the data exchanges within the network system 100 may be dependent upon user-selected functions available through one or more client or user interfaces (UIs). The UIs may be associated with a client machine, such as a client machine 106 using a web client 110. The web client 110 may be in communication with the network-based publisher 102 via a web server 120. The UIs may also be associated with a client machine 108 using a programmatic client 112, such as a client application, or a third party server 114 hosting a third party application 116. It can be appreciated in various embodiments the client machine 106, 108, or third party application 114 may be associated with a buyer, a seller, a third party electronic commerce platform, a payment service provider, or a shipping service provider, each in communication with the network-based publisher 102 and optionally each other. The buyers and sellers may be any one of individuals, merchants, or service providers, among other things.

In various embodiments, the client machine may connect to a network through which the client machine requests and accesses content from one or more content providers. The content providers may broadcast, multicast, stream, or otherwise transmit the content to the client devices. In some embodiments, the client machine may store content previously retrieved from a content provider and may access the stored content. In addition to the above-disclosed embodiments, in various embodiments, the client machine may be associated with a user or content viewer.

Turning specifically to the network-based publisher 102, an application program interface (API) server 118 and a web server 120 are coupled to, and provide programmatic and web interfaces respectively to, one or more application servers 122. The application servers 122 host one or more publication application(s) 124. The application servers 122 are, in turn, shown to be coupled to one or more database server(s) 126 that facilitate access to one or more database(s) 128.

In one embodiment, the web server 120 and the API server 118 communicate and receive data pertaining to listings, transactions, feedback, and content items among other things, via various user input tools. For example, the web server 120 may send and receive data to and from a toolbar or webpage on a browser application (e.g., web client 110) operating on a client machine (e.g., client machine 106). The API server 118 may send and receive data to and from an application (e.g., client application 112 or third party application 116) running on another client machine (e.g., client machine 108 or third party server 114).

The publication application(s) 124 may provide a number of publisher functions and services (e.g., search, listing, content viewing, payment, etc.) to users that access the network-based publisher 102. For example, the publication application(s) 124 may provide a number of services and functions to users for listing goods and/or services for sale, searching for goods and services, facilitating transactions, and reviewing and providing feedback about transactions and associated users. Additionally, the publication application(s) 124 may track and store data and metadata relating to listings, transactions, and user interactions with the network-based publisher 102. In some embodiments, the publication application(s) 124 may publish or otherwise provide access to content items stored in application servers 122 or database(s) 128 accessible to the application servers 122 and/or the database server(s) 126.

FIG. 1 also illustrates a third party application 116 that may execute on a third party server 114 and may have programmatic access to the network-based publisher 102 via the programmatic interface provided by the API server 118. For example, the third party application 116 may use information retrieved from the network-based publisher 102 to support one or more features or functions on a website hosted by the third party. The third party website may, provide one or more listing, feedback, publisher or payment functions that are supported by the relevant applications of the network-based publisher 102. However, it will be understood that the functions provided by the third-party website are not limited thereto.

Figure 2:
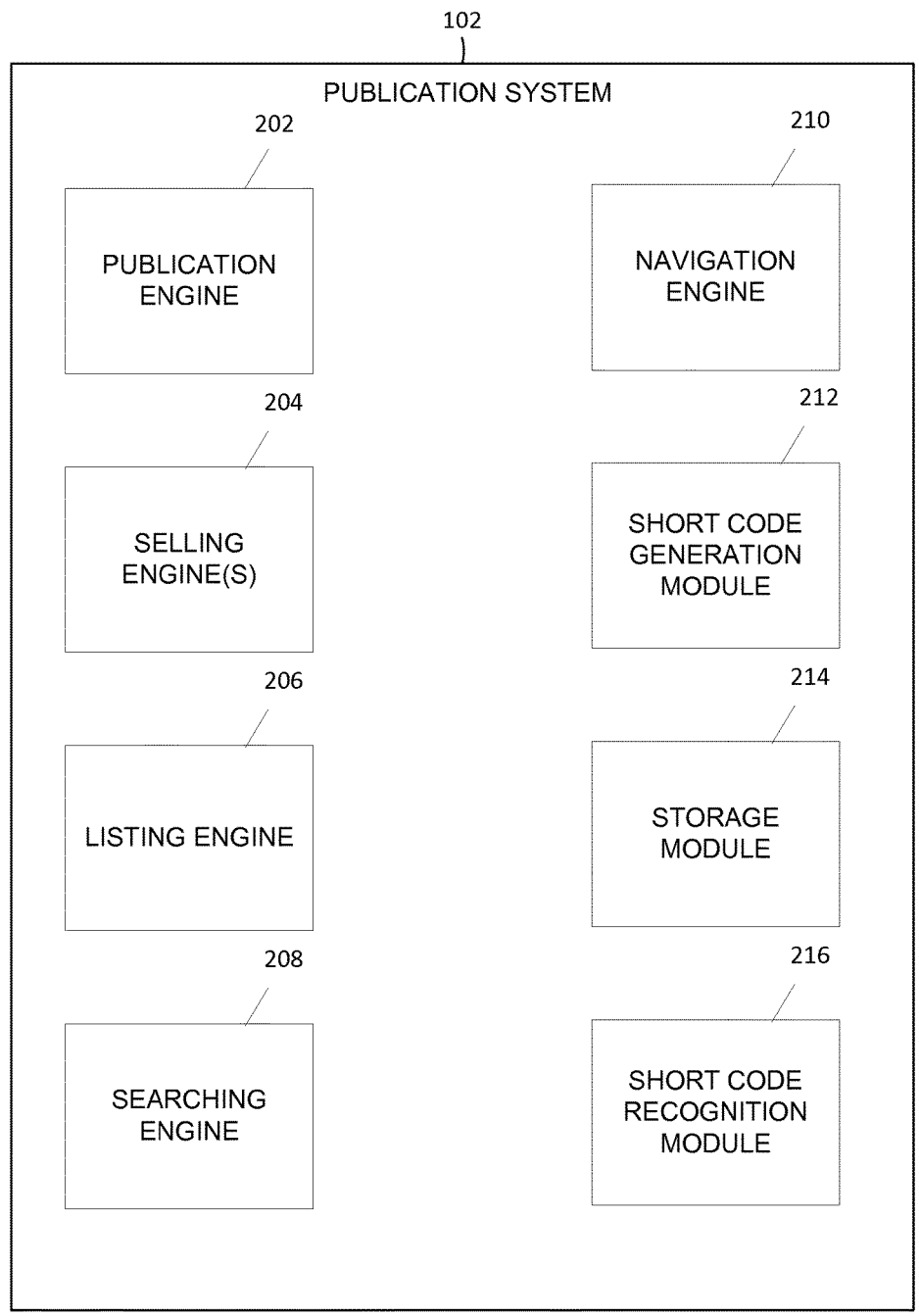
FIG. 2 is a block diagram of various components of a network-based publisher, according to some embodiments.

Referring now to FIG. 2, a block diagram illustrating multiple components that, in one example embodiment, are provided within the network-based publisher 102 of the networked system 100 is shown. The publication system 102 may be hosted on dedicated or shared server machines (not shown) that are communicatively coupled to enable communications between the server machines. The multiple components, themselves, are communicatively coupled (e.g., via appropriate interfaces), either directly or indirectly, to each other and to various data sources, to allow information to be passed between the components or to allow the components to share and access common data. Furthermore, the components may access the one or more database(s) 128 via the one or more database servers 126, both shown in FIG. 1.

In one embodiment, the publication system 102 comprises a network-based marketplace and provides a number of publishing, listing, and price-setting mechanisms whereby a seller (e.g., business or consumer) may list (or publish information concerning) goods or services for sale. A buyer can search for, express interest in, or indicate a desire to purchase such goods or services. The seller, the buyer, or any combination of the seller and buyer can set a price for a transaction pertaining to the goods or services. In some embodiments, a buyer may also post listings containing items the buyer is looking to purchase. Sellers may view listings posted by buyers and may provide the item to the buyer if possible, by, in some embodiments, providing the item to the buyer directly or by redirecting the buyer to a listing of the requested item that has been posted by the seller.

In some embodiments, the publication system 102 comprises one or more content providers, each of whom may comprises one or more content servers, application servers, and database servers by which content may be provided to users of the publication system 102. For example, the publication system 102 may represent a content broadcasting and streaming system for providing users access to content items, such as television shows, movies, and other multimedia content. In other examples, the publication system 102 may represent a content system for providing users access to content items in the form of one or more websites and web pages that deliver content to users via an application native to a client machine or via a web browsing application executing on a client machine.

To this end, the publication system 102 may comprise at least one publication engine 202 and one or more selling engines 204. The publication engine 202 may publish information, such as item listings or product description pages, on the publication system 102. In some embodiments, the selling engines 204 may comprise one or more fixed-price engines that support fixed-price listing and price setting mechanisms and one or more auction engines that support auction-format listing and price setting mechanisms (e.g., English, Dutch, Chinese, Double, Reverse auctions, etc.). The various auction engines may also provide a number of features in support of these auction-format listings, such as a reserve price feature whereby a seller may specify a reserve price in connection with a listing and a proxy-bidding feature whereby a bidder may invoke automated proxy bidding.

A listing engine 206 allows sellers to conveniently author listings of items or authors to author publications. In one embodiment, the listings pertain to goods or services that a user (e.g., a seller) wishes to transact via the publication system 102. Each good or service is associated with a particular category. The listing engine 206 may receive listing data such as title, description, and aspect name/value pairs. Furthermore, each listing for a good or service may be assigned an item identifier. In other embodiments, a user may create a listing that is an advertisement or other form of information publication. The listing information may then be stored to one or more storage devices coupled to the publication system 102 (e.g., databases 128). Listings also may comprise product description pages that display a product and information (e.g., product title, specifications, reviews) associated with the product. In some embodiments, the product description page may include an aggregation of item listings that correspond to the product described on the product description page.

The listing engine 206 also may allow buyers to conveniently author listings or requests for items desired to be purchased. In some embodiments, the listings may pertain to goods or services that a user (e.g., a buyer) wishes to transact via the publication system 102. Each good or service is associated with a particular category. The listing engine 206 may receive as much or as little listing data, such as title, description, and aspect name/value pairs, that the buyer is aware of about the requested item. In some embodiments, the listing engine 206 may parse the buyer's submitted item information and may complete incomplete portions of the listing. For example, if the buyer provides a brief description of a requested item, the listing engine 306 may parse the description, extract key terms and use those terms to make a determination of the identity of the item. Using the determined item identity, the listing engine 206 may retrieve additional item details for inclusion in the buyer item request. In some embodiments, the listing engine 206 may assign an item identifier to each listing for a good or service.

Searching the network-based publication system 102 is facilitated by a searching engine 208. For example, the searching engine 208 enables keyword queries of listings published via the publication system 102. In example embodiments, the searching engine 208 receives the keyword queries from a device of a user and conducts a review of the storage device storing the listing information. The review will enable compilation of a result set of listings that may be sorted and returned to the client device (e.g., client device 106) of the user. The searching engine 208 may record the query (e.g., keywords) and any subsequent user actions and behaviors (e.g., navigations).

In a further example, a navigation engine 210 allows users to navigate through various categories, catalogs, or inventory data structures according to which listings may be classified within the publication system 102. For example, the navigation engine 210 allows a user to successively navigate down a category tree comprising a hierarchy of categories (e.g., the category tree structure 100) until a particular set of listing is reached. Various other navigation applications within the navigation engine 210 may be provided to supplement the searching and browsing applications. The navigation engine 210 may record the various user actions (e.g., clicks) performed by the user in order to navigate down the category tree.

In the event a user is accessing content and desires to cease accessing content from one device and resume accessing the content from a second device, a short code generation module 212 may provide a short code that represents a state of the content. The short code may be stored in a storage module 214. A short code recognition module 216 may provide a user interface and logic to recognize and process the submission of the short code on the second device.

Figure 3:
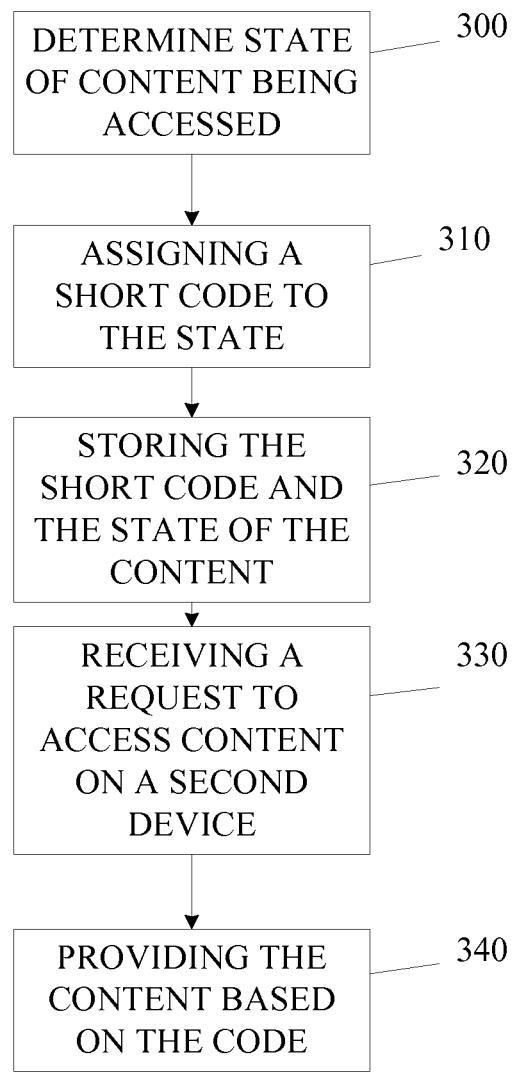
FIG. 3 is a flowchart illustrating an example method, according to an example embodiment.

FIG. 3 illustrates a method for providing a short code for transferring a state of content from a first user device to a second user device.

With reference to FIG. 3, a short code generation module 212 determines a state of the content in operation 300. The state of the content can include, for example, a point in the content at which the user is accessing the content. In at least one embodiment, the operation 300 a user may trigger a request for a short code. For example, the user may press or click a user interface button requesting a short code. In at least one embodiment, the content itself may trigger operation 300. For example, computer-implemented algorithms for displaying the content can cause short codes to be generated and displayed at any point or upon any event during display of the content.

The state of the content may refer to the progress or consumption point of the content. In other words, when a user stops accessing content from one device, the state may represent the point at which the user was last accessing the content on the first device. The state of the content may further refer to any parameters, queries, etc., that the user was implementing at the point the user ceased accessing the content on the first device.

In operation 310, the short code generation module 212 assigns a short code to the determined state. The short code may include a limited number of characters. For example, the short code may include eight characters.

In some embodiments, the short code may be a randomly or pseudo-randomly generated code. In other embodiments, the short code may be a code derived from the accessed content. In some embodiments, the short code is not a URL, but is a set of numerical digits capable of being entered into a variety of devices, such as televisions, computing devices, mobile devices, DVD players, video game systems, and so forth. The short code may be entered into these devices using user input devices, such as a remote control, keyboard, scroll wheel, or mouse, or by entering the short code into a user interface using an input device (e.g., arrow keys on a remote control, keypad on a keyboard). The short code may time out after a certain amount of time, for example, to maintain user privacy or to prevent fraudulent transactions.

In operation 320, the short code generation module 212 stores the short code and the state of the content in a storage module 214. In some embodiments, the short codes may be stored with the content, or parameters related to the content, associated with the short code. In some embodiments, the short codes may be stored with an identifier of a user accessing the content associated with the short code.

The short codes and content may be stored in one or more database tables. In some embodiments, the tables may enable a short code to be mapped to a state of the content. The state of the content may be identified by a URL or other identifier that enables the publication system 102 to retrieve the content represented by or related to the short code from local or remote storage. In some embodiments, the storage module 214 may store the content in a state corresponding to the point in time when the short code was generated.

An illustrative example of a database table for storing short codes is shown in FIG. 4. In the illustrative example, the short code may be listed in a first column or field of the database table. A second column may include a web page, for example in the form of a URL, corresponding to the short code. A third column may include a section of the web page that the user was accessing when the short code generation module 212 generated the short code and a fourth column may include a subsection of this section. A fifth column may include terms that were used to query or search for items on the web page, and a sixth column may include other parameters related to the search. For example, a user may specify that he wishes to view auction products in a grid view, and therefore this parameter is reflected in the state of the content represented by the short code.

Referring again to FIG. 3, in operation 330, the publication system 102 may receive a request to access content on a second device.

In response to this request, or at any time previous to the request, in one example embodiment, the short code generation module 212 may transmit the generated short code to a short code recognition module 216. In at least another example embodiment, the short code generation module 212 displays the short code to the user and the user enters the short code on the second device when the user wishes to access the content on the second device. The short code recognition module 216 may provide a user interface and logic to recognize and process the submission of a short code on a device. In at least another example embodiment, the short code recognition module 216 retrieves the short code from the storage module 214.

In operation 340, the short code recognition module 216 navigates to or provides the content on the second device, based on the short code.

Figure 5:
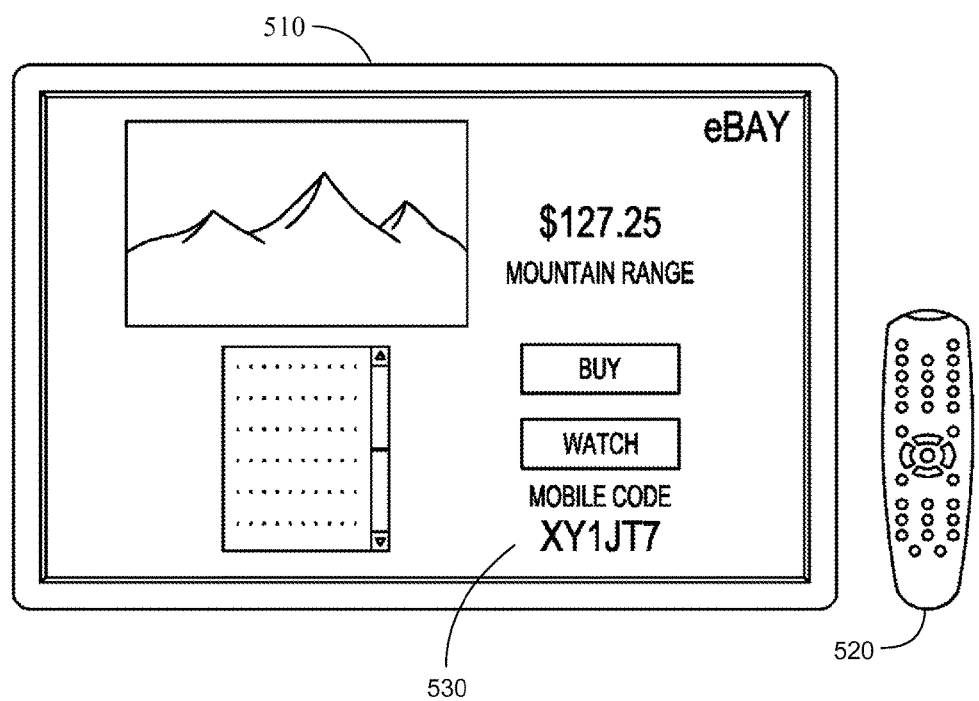
FIG. 5 shows an illustrative example of short code generation.

FIG. 5 depicts an illustrative example of operations of the method of FIG. 3. As shown in FIG. 5, a user may be viewing an auction, for example, on a television 510. The user may press a button of remote control 520 to request a short code 530. The short code 530 represents the state of the content at the time the user is accessing it on the television 510. In the illustrative example, the state of the content includes having navigated to a particular auction page for a particular product. The auction page for the product may include buttons or other user input devices presenting opportunities to either buy or watch the product listing. A user may wish to perform either of these actions, for example, or other actions (not shown) on a second device without having to re-navigate to the desired product auction listing.

Figure 6:
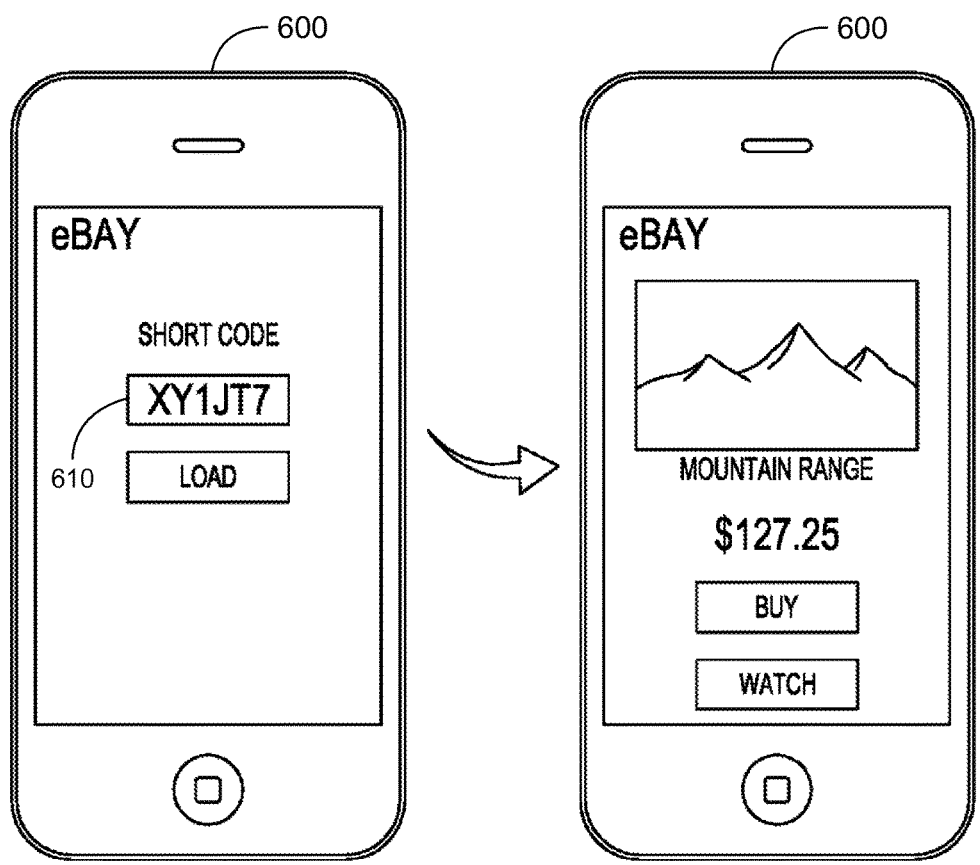
FIG. 6 shows an illustrative example of navigating to portions of content based on a short code.

FIG. 6 depicts an illustrative example of further operations of the method of FIG. 3. As shown in the left side of FIG. 6, the user, when on a second device for example a mobile device 600, enters a short code 610. In example embodiments, the first device may transmit the short code over a network to the publication system 102. In other example embodiments, the second device may retrieve the short code and data from the storage module 214, described with respect to FIGS. 2 and 4. In some embodiments, the second device may use the entered short code to look up a mapping of short codes and content in one or more tables, described with respect to FIG. 4. When a record or entry containing a short code is found that matches the entered short code, the corresponding content in the record may be retrieved. In some embodiments, retrieval may entail traversing a network to retrieve remotely stored content, while in other embodiments, retrieval may occur locally. In other embodiments, local and remote data retrieval may be warranted.

On the right side of FIG. 6, the short code recognition module 216 recognizes the code and navigates to the same content the user was viewing on the first device, for example the television discussed above with respect to FIG. 5. The content corresponding to the short code may be transmitted to the device that sent the short code to the publication system 102 at the state at which the short code was generated. In this respect, the user may resume accessing content from the point at which the user stopped accessing the content on the first device.

In a non-limiting example embodiment, the user may be browsing items available for purchase on an e-commerce website on a first device, such as a television. The user may have added one or more items to a shopping cart or purchase wish list. At this point, for various reasons, the user may decide to stop accessing the e-commerce website on the first device. The user may request that a short code that encapsulates a state of the user's shopping experience, that is the user's browsing history and items located in the user's shopping cart or wish list, be generated. The user may enter the short code into a second device, such as a computing device, although the user may also enter the short code into the first device to resume browsing and shopping. The short code may cause the computing device to access the e-commerce website at the point at which the user stopped accessing the site on the first device. The user may then finish shopping on the e-commerce site and purchase the items included in the user's shopping cart.

In some embodiments, the e-commerce website may generate the short code in response to the user's request for a short code. In other embodiments, the first device itself may include a module that generates the short code and transmits the short code to the e-commerce website for storage. When the user submits the short code on the second device, the e-commerce website may retrieve the short code from memory and transmit corresponding content at the state at which the short code was generated to the second device.

In another non-limiting example embodiment, the user may be viewing a content item, such as a television show, movie, or multimedia clip on a first device, such as a television or tablet computing device. The user may decide to stop accessing the content item from the first device.

Accordingly, the user may request that a short code be generated to represent the point in the content item at which the user stopped viewing the content item. The user may enter the short code in a second device and resume watching the content item from the point at which the user previously stopped watching the content item on the first device.

In some embodiments, the content provider may generate the short code in response to the user's request for a short code. In other embodiments, the first device may generate the short code and transmit the generated short code to the content provider for storage. When the content provider receives a short code from the second device, the content provider may compare the short code to stored short codes to identify a content item to retrieve and to identify a point in the content item at which to the content item is to be accessed by the user. The content item is provided to the second device for the user to resume viewing.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Additionally, in some embodiments, one or more of the engines or modules described may comprise one or modules to carry out specific operations or tasks for the engine. For example, although not shown in FIG. 3, the short code recognition module 312 may include a user interface module to generate a user interface capable of receiving a short code submitted by a user.

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 7:
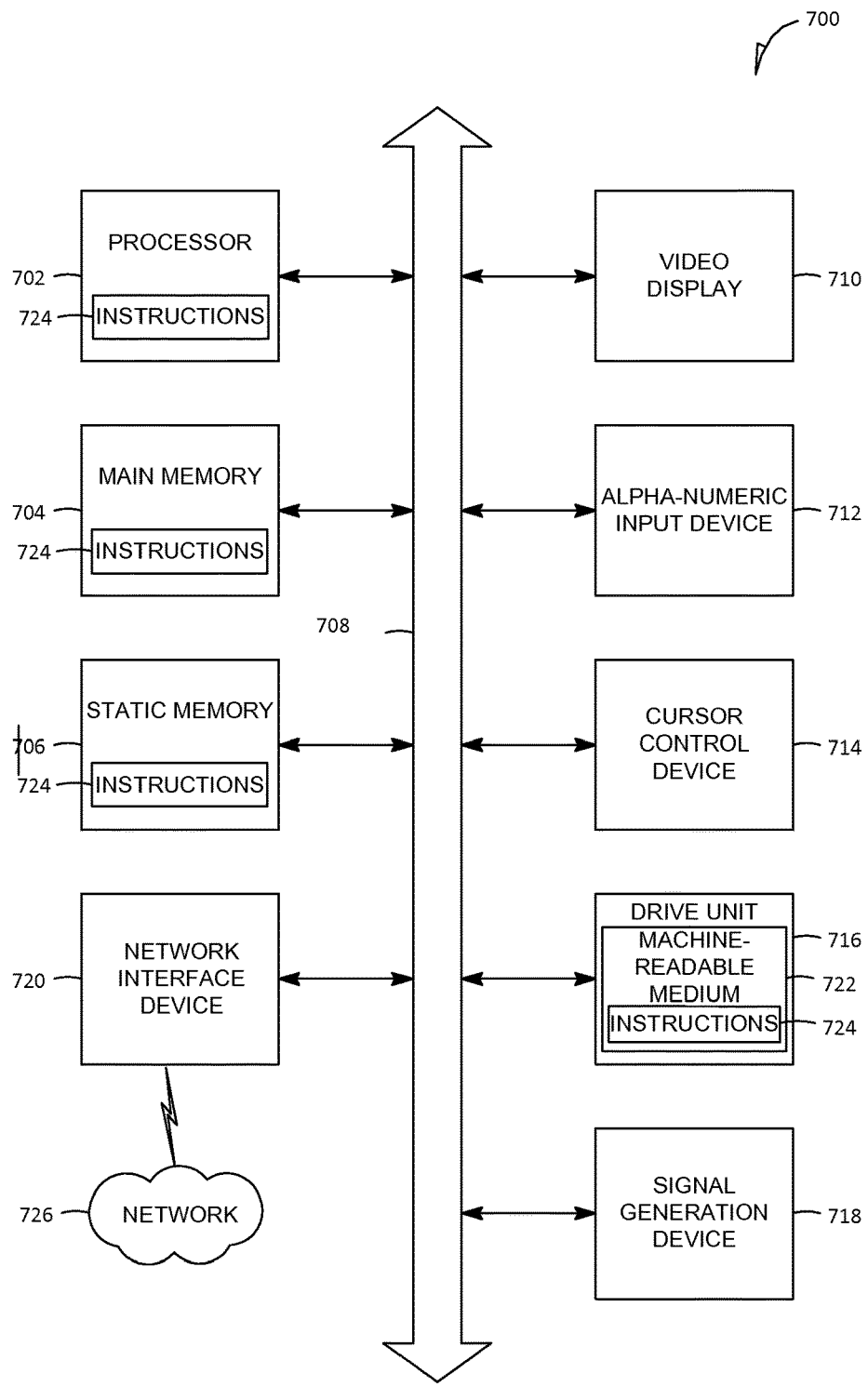
FIG. 7 shows a diagrammatic representation of a machine in the example form of a computer system within which a set of instructions may be executed to cause the machine to perform any one or more of the methodologies discussed herein.

FIG. 7 shows a diagrammatic representation of machine in the exemplary form of a computer system 700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU) a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a cursor control device 714 (e.g., a mouse), a disk drive unit 716, a signal generation device 718 (e.g., a speaker) and a network interface device 720.

Machine-Readable Medium

The disk drive unit 716 includes a machine-readable medium 722 on which is stored one or more sets of instructions (e.g., software 724) embodying any one or more of the methodologies or functions described herein. The software 724 may also reside, completely or at least partially, within the main memory 704 and/or within the processor 702 during execution thereof by the computer system 700, the main memory 704 and the processor 702 also constituting machine-readable media. The software 724 may further be transmitted or received over a network 726 via the network interface device 720.

While the machine-readable medium 722 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals.

Transmission Medium

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Thus, methods and apparatuses for transferring a state of content using short codes have been described. Although the present disclosure has been described with reference to specific exemplary embodiments, it may be evident that various modifications and changes may be made to these embodiments without departing from the broader spirit and scope of the disclosure. Accordingly, the specification and drawings are to be regarded in an illustrative rather than a restrictive sense.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
    determining a state of content being accessed on a first user device of a first user, the state of the content corresponding to personalized dynamic content of a webpage generated as a response to a first user's request for personalized content from the webpage, the personalized dynamic content corresponding to a state of the webpage the first user ceased accessing the webpage on the first user device;
    assigning an identifier to the state of the content;
    generating, by a processor of a machine, a code derived from the content and having fewer characters than the identifier;
    assigning the code to the state of the content;
    mapping the code to the identifier;
    storing the code and the state of the content;
    causing presentation of the code on the first user device;
    receiving an entry of the code by the first user on a second device; and
    providing the content to the first user on the second device of the first user based on entry of the code by the first user on the second device such that the first user is able to resume access of the personalized dynamic content on the second device at the state of the webpage at which the first user ceased accessing the webpage on the first user device.

2. The method of claim 1, wherein the determining is triggered by a user request for a code.

3. The method of claim 1, wherein the determining is triggered by an event within the content.

4. The method of claim 1, wherein the code becomes invalid after a timeout duration.

5. The method of claim 1, wherein the providing transmits the code over a network interface.

6. The method of claim 5, wherein the providing further transmits the content related to the code over the network interface.

7. The method of claim 1, wherein the code is retrieved from a data storage device.

8. The method of claim 1, wherein the state of the content is indicative of a consumption point of content at which a user ceased accessing the content on the first user device.

9. The method of claim 1, wherein the first user is a second user.

10. A system comprising:
    a non-transitory memory storing instructions; and
    one or more processors configured to execute the instructions to cause the system to:
        determine a state of content being accessed on a first user device of a first user, the state of the content corresponding to personalized dynamic content of a webpage generated as a response to a first user's request for personalized content from the webpage, the personalized dynamic content corresponding to a state of the webpage the first user ceased accessing the webpage on the first user device;
        assign an identifier to the state of the content;
        generate a code derived from the content and having fewer characters than the identifier;
        map the code to the identifier;
        assign the code to the state of the content;
        cause presentation of the code on the first user device;
        store the code and the state of the content; and
        receive the code from a first user on a second device and enable the first user to navigate to the content on a second device of the first user based on entry of the code by the first user on the second device such that the first user is able to resume access of the personalized dynamic content on the second device at the state of the webpage at which the first user ceased accessing the webpage on the first user device.

11. The system of claim 10, wherein the instructions cause the system to determine the state of the content upon receiving a user request for a code.

12. The system of claim 10, wherein the instructions cause the system to determine the state of the content at a point during access of the content and is triggered by an event within the content.

13. The system of claim 10, wherein the instructions further cause the system to transmit the code.

14. The system of claim 13, wherein the system transmits the code to a mobile user device.

15. A non-transitory machine-readable medium having instructions embodied thereon, the instructions executable by one or more machines to performance of operations comprising:
    determining a state of content being accessed on a first user device of a first user, the state of the content corresponding to personalized dynamic content of a webpage generated as a response to a first user's request for personalized content from the webpage, the personalized dynamic content corresponding to a state of the webpage the first user ceased accessing the webpage on the first user device;
    assigning an identifier to the state of the content;
    generating a code derived from the content and having fewer characters than the identifier;
    mapping the code to the identifier;
    assigning the code to the state of the content;
    storing the code and the state of the content;
    causing presentation of the code on the first user device;
    receiving an entry of the code by the first user on a second device; and
    providing the content to the first user on the second device of the first user based on entry of the code by the first user on the second device such that the first user is able to resume access of the personalized dynamic content on the second device at the state of the webpage at which the first user ceased accessing the webpage on the first user device.

16. The non-transitory computer-readable medium of claim 15, wherein the operations further comprise preventing use of the code after a timeout duration.

17. The non-transitory computer-readable medium of claim 15, wherein the operations further comprise:
   providing a user interface; and
   receiving a user input of the code over the user interface.

18. The non-transitory computer-readable medium of claim 15, wherein the operations further comprise retrieving the code and the state of the content from a memory.

19. The non-transitory computer-readable medium of claim 18, wherein the code and the state of the content are stored in a database table in the memory.

* * * * *